(12) United States Patent
Schrinner

(10) Patent No.: US 9,896,214 B1
(45) Date of Patent: Feb. 20, 2018

(54) HOSE MOVEMENT SENSOR

(75) Inventor: Scott E. Schrinner, Jamestown, OH (US)

(73) Assignee: Twist, Inc., Jamestown, OH (US)

( * ) Notice: Subject to any disclaimer, the term of this patent is extended or adjusted under 35 U.S.C. 154(b) by 1707 days.

(21) Appl. No.: 13/030,908

(22) Filed: Feb. 18, 2011

(51) Int. Cl.
*B64D 13/00* (2006.01)
(52) U.S. Cl.
CPC ................... *B64D 13/00* (2013.01)
(58) Field of Classification Search
CPC ................. B64F 1/362; B64F 1/364
USPC .......................................... 454/76
See application file for complete search history.

(56) References Cited

U.S. PATENT DOCUMENTS

| | | | | |
|---|---|---|---|---|
| 3,859,481 A | * | 1/1975 | Sprague ..................... 191/12 R |
| 4,101,100 A | * | 7/1978 | Smith et al. .............. 244/114 R |
| 4,269,240 A | * | 5/1981 | Cutore ......................... 141/392 |
| 4,327,784 A | * | 5/1982 | Denniston .................... 141/387 |
| 4,526,090 A | * | 7/1985 | Maier .......................... 454/119 |
| 4,620,339 A | * | 11/1986 | Shepheard ..................... 14/71.5 |
| 4,660,465 A | * | 4/1987 | Jentzsch et al. ................ 454/64 |
| 4,715,077 A | * | 12/1987 | Shepheard ..................... 14/71.5 |
| RE32,687 E | * | 6/1988 | Shepheard ..................... 14/71.5 |
| 5,149,017 A | * | 9/1992 | McEntire et al. ........ 244/114 R |
| 5,556,332 A | * | 9/1996 | Schumacher .................... 454/76 |
| 5,720,656 A | * | 2/1998 | Savage .......................... 454/119 |
| 6,443,830 B1 | * | 9/2002 | Vandamme ..................... 454/76 |
| 6,776,705 B2 | | 8/2004 | Bombardi et al. |
| 6,821,201 B2 | | 11/2004 | Bombardi et al. |
| 6,834,668 B2 | | 12/2004 | Bombardi et al. |
| 7,219,857 B2 | * | 5/2007 | Takacs et al. ............. 244/135 A |
| 7,894,950 B2 | * | 2/2011 | Williamson et al. ........ 701/29.8 |
| 8,174,396 B1 | * | 5/2012 | Schrinner et al. ............ 340/584 |
| 8,459,296 B2 | * | 6/2013 | Gosis et al. ............... 137/355.2 |
| 2004/0209565 A1 | * | 10/2004 | Bombardi et al. ............ 454/119 |
| 2006/0108475 A1 | * | 5/2006 | Bartov ...................... 244/135 A |
| 2006/0278044 A1 | * | 12/2006 | Kassabian ........................ 81/9.3 |
| 2007/0051852 A1 | * | 3/2007 | McCoskey et al. ........ 244/137.1 |
| 2009/0032652 A1 | * | 2/2009 | Gosis et al. ..................... 248/75 |
| 2009/0197516 A1 | * | 8/2009 | Wright et al. ................. 454/119 |
| 2011/0042939 A1 | * | 2/2011 | Mustar ..................... 285/148.15 |
| 2011/0050430 A1 | * | 3/2011 | Wright et al. ................ 340/584 |

* cited by examiner

*Primary Examiner* — Vivek Shirsat
(74) *Attorney, Agent, or Firm* — Wood Herron & Evans LLP

(57) ABSTRACT

A hose movement detector for an aircraft PCA hose management system comprises a sensor that provides a signal to indicate a first condition when a hose is moving into an aircraft ventilation hose management system or out of the aircraft ventilation hose management system and that does not provide the signal when the hose is not moving. The output of the sensor is usable to disable hose drive motors when a fault condition is preventing the hose from moving, such as the hose being caught by an obstruction, and thus avoid damage to the hose management system or its hose.

18 Claims, 6 Drawing Sheets

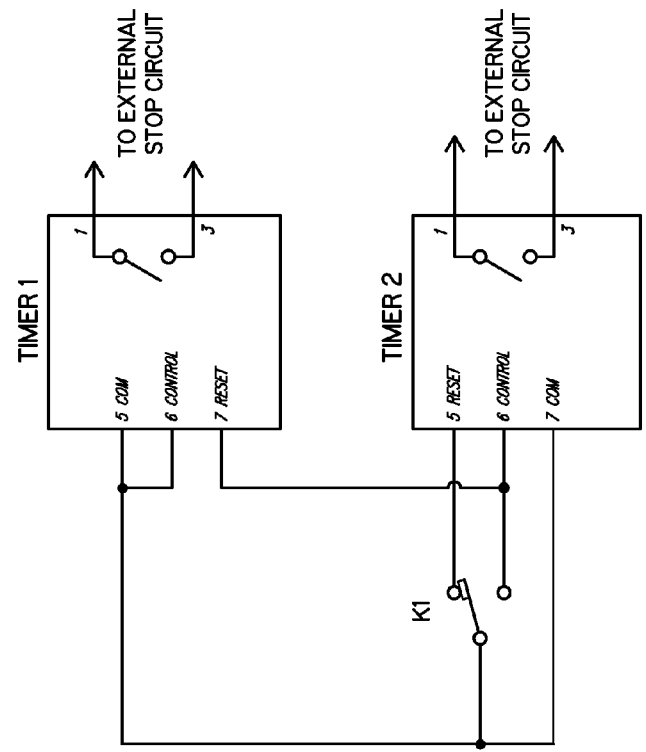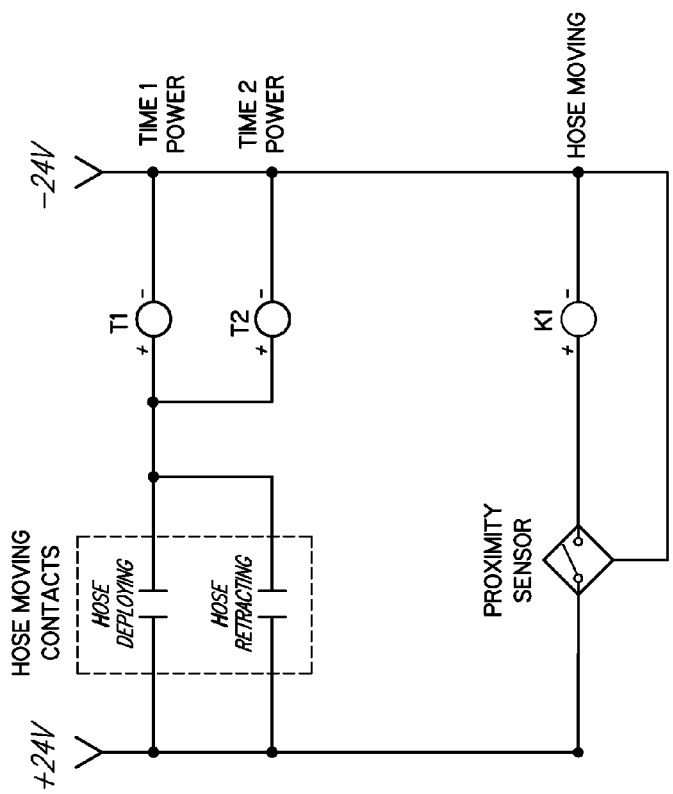
FIG. 5

HOSE MOVEMENT SENSOR

RELATED APPLICATIONS

The present application is related to U.S. patent application Ser. No. 12/025,022, entitled HOSE MANAGEMENT SYSTEM FOR SUPPLYING CONDITIONED AIR TO AN AIRCRAFT, filed Feb. 2, 2008 and assigned to the same assignee as this application, which is hereby incorporated herein in its entirety.

FIELD OF THE INVENTION

The present invention generally relates to ground-based conditioned air systems for aircraft, and more specifically to air hose extending and retracting devices.

BACKGROUND

It is generally known to supply commercial aircraft with conditioned air for heating and cooling when the aircraft is stationary at a gate. In this document, the term gate is meant to refer to any place that an aircraft receives or discharges passengers or cargo. This may be by way of a telescoping corridor (also referred to as a walkway, bridge way, jet bridge), stairs, or any other facility. Typically, conditioned air is supplied to the aircraft from a pre-conditioned air (PCA) unit associated with the gate that is a part of the airport terminal. The PCA unit may produce heated air or cooled air depending on the needs of the aircraft it is servicing. The PCA outputs its air into a duct that may be rigid or flexible, and then the air is delivered from the gate to the aircraft with a flexible and usually insulated air hose.

Devices for deploying and retracting a hose are known, for example in U.S. Pat. Nos. 6,821,201, 6,776,705, and 6,834,668 to Bombardi et al. In a retractable hose device such as described by Bombardi, the power required by the dispensing and retracting device to reliably do its job varies with the length of the hose installed in the device, temperature, and a variety of factors. For example, a long hose, due to weight and drag, requires a different level of energy to retract it than does a short hose. Further a hose that becomes wrapped around an obstacle may stop moving entirely. An improved device is described in the above-referenced U.S. patent application Ser. No. 12/025,022 filed Feb. 2, 2008 by Wright et. al, and hereby incorporated by reference in its entirety. In at least one embodiment, the hose management system in the Ser. No. 12/025,022 application has torque sensing circuitry that is adjustable according to the hose installed. Further, this torque sensing circuitry is employed to stop the retracting motor should it sense a high level of torque, indicating that the hose is snagged on an object, for example a baggage cart. However this method of detecting a snag to stop the motor sometimes fails to work. This failure may occur, for example, if the torque sensing circuitry is set to respond at a value greater than the force generated by the tread slipping over the surface of the hose. In such cases, the hose remains still while the treads keep moving, abrading and damaging the stationary hose. Therefore there is a need for an improved device to stop the tread from trying to move the hose, when the hose is unable to move.

SUMMARY OF THE INVENTION

In accordance with principles of the present invention, the needs identified above are met by a hose movement detector that comprises a sensor that provides a signal to indicate a first condition when a hose is moving into an aircraft ventilation hose management system or out of the aircraft ventilation hose management system and that does not provide the signal when the hose is not moving. The output of the sensor is thus usable to disable hose drive motors when a fault condition is preventing the hose from moving, such as the hose being caught by an obstruction.

In the disclosed particular embodiment, the detector comprises a rotating member rotationally driven by the hose when the hose moves into or out of the aircraft ventilation hose management system, a positioner that presses the rotating member against the outside surface of the hose, such as a spring and pivot assembly driving an arm to which the wheel is mounted, against the outside surface of the hose. A sensor senses rotation of the rotating member to provide the signal; in the illustrated embodiment the sensor is a proximity detector which detects holes in the rotating member which pass under the sensor as the rotating member is rotated.

BRIEF DESCRIPTION OF THE DRAWINGS

The accompanying drawings, which are incorporated in and constitute a part of this specification, illustrate embodiments of the invention and, together with the general description of the invention given above, and the detailed description given below, serve to explain the principles of the invention.

FIG. 5 is an electrical schematic that includes the embodiment of the previous figures.

DETAILED DESCRIPTION

Figure 1:
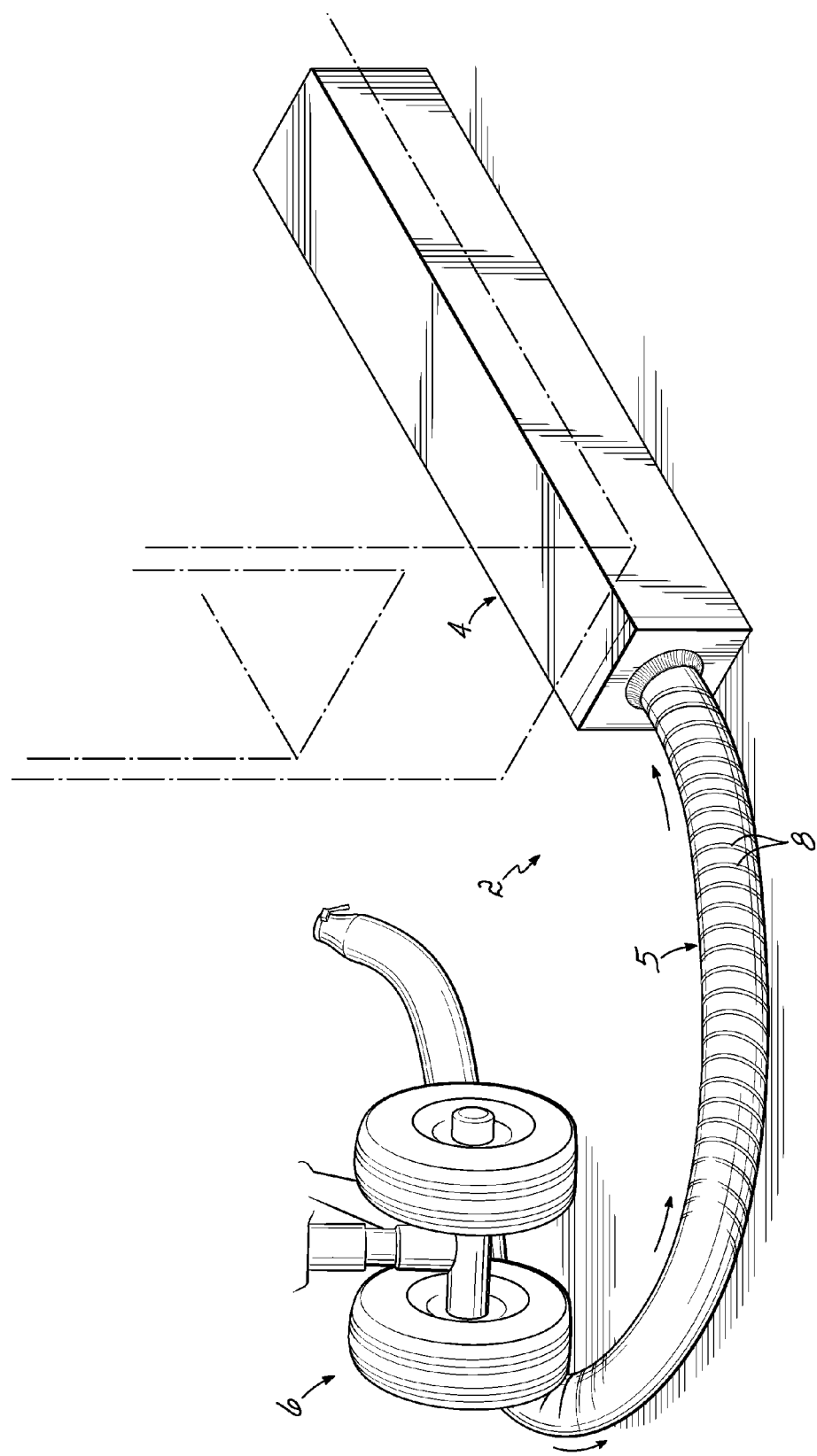
FIG. 1 is a perspective schematic cutaway view of a hose management device and a hose extending therefrom which is caught on the landing gear of an airplane.

FIG. 1 illustrates a hose management system 2 with a housing 4 pulling in an air duct hose 5 that has become caught around an obstacle, such as airplane landing gear 6. This condition can frequently occur in use of a hose management device and normally must be reconciled by ground personnel re-positioning the hose 5 free of the obstacle. When the hose is caught in this manner, the retracting drive in the hose management device must detect the condition and disable further drive, or damage to the hose or drive may result.

The above-noted patent application Ser. No. 12/025,022 describes a torque sensor system in a drive mechanism for detecting excessive drag on the hose, and in response disabling the drive motors to avoid damage.

Figure 2:
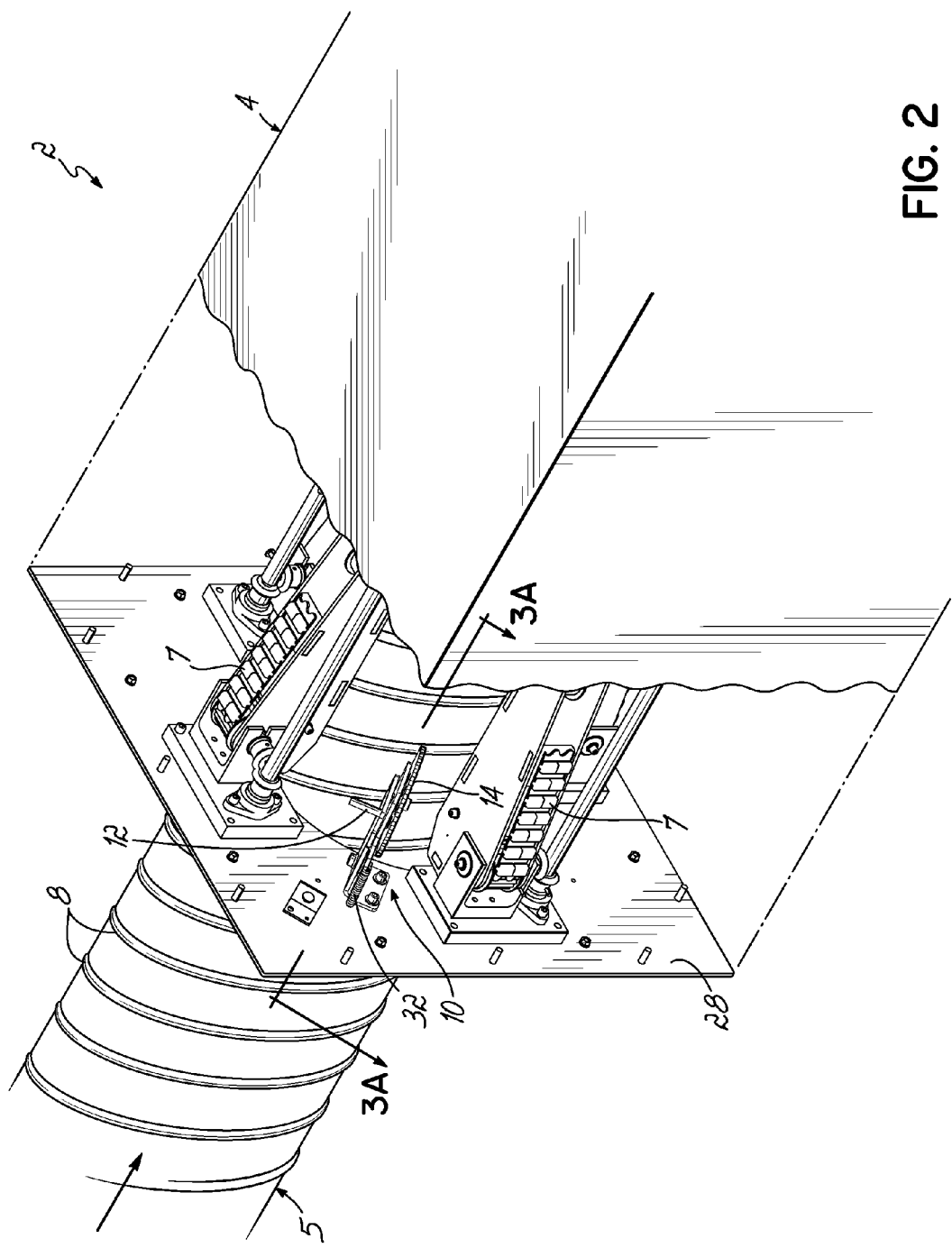
FIG. 2 is a perspective partial cutaway view of the inlet area of a hose management device illustrating the drive motors and a sensor device according to an embodiment of the present invention.

FIG. 2 is a schematic view inside the hose management system, showing tractor belts 7 that drive the movement of the hose 5 by pushing or pulling on evenly spaced scuff strips 8. Further details on the drive system shown in FIG. 2 can be found in the above noted patent application Ser. No. 12/025,022.

FIG. 2 also illustrates a hose movement detector 10 positioned to detect whether the hose 5 is moving, discussed in greater detail below.

Figure 3A:
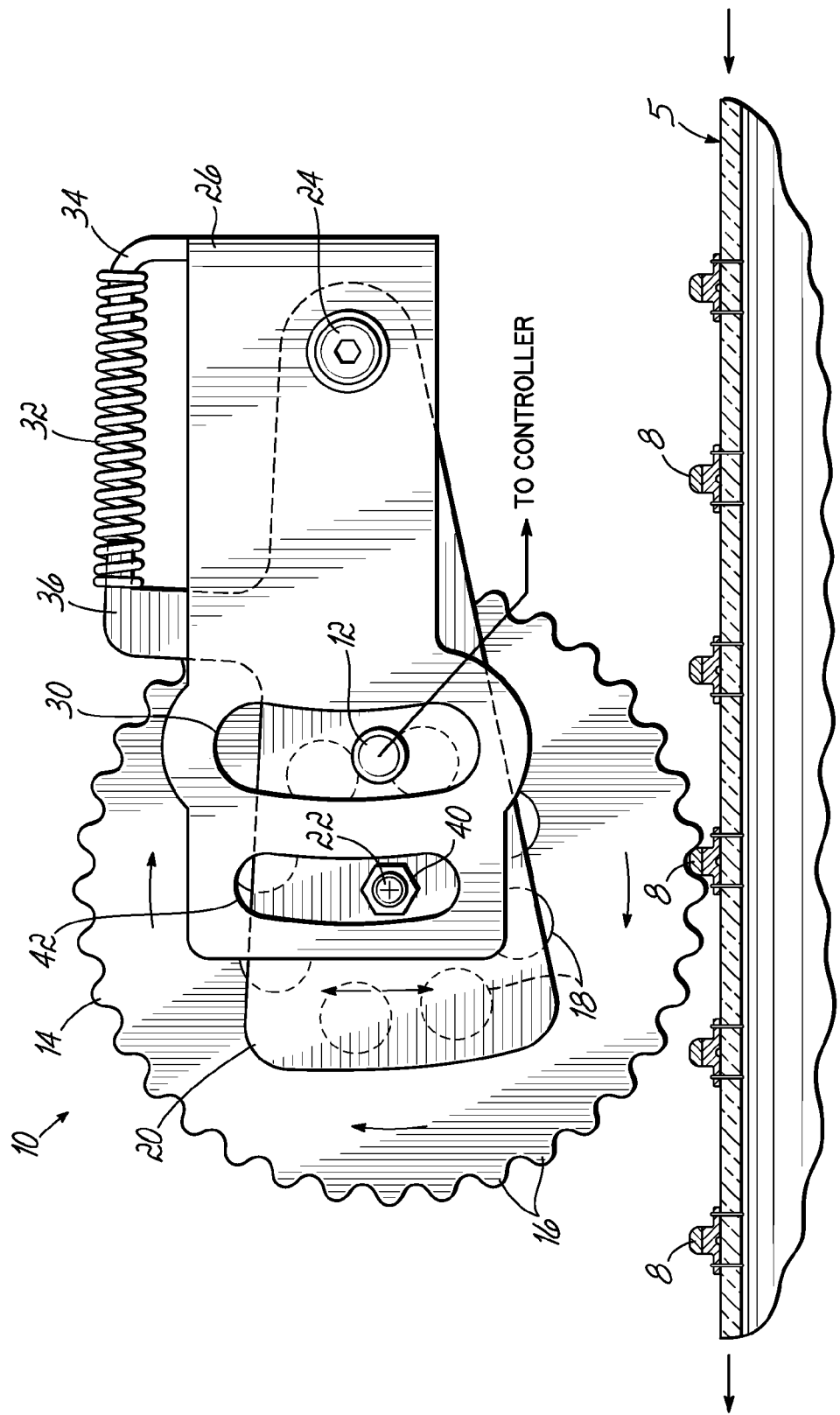
FIGS. 3A and 3B are cross-section views taken on line 3A-3A as indicated in FIG. 2.
Figure 3B:
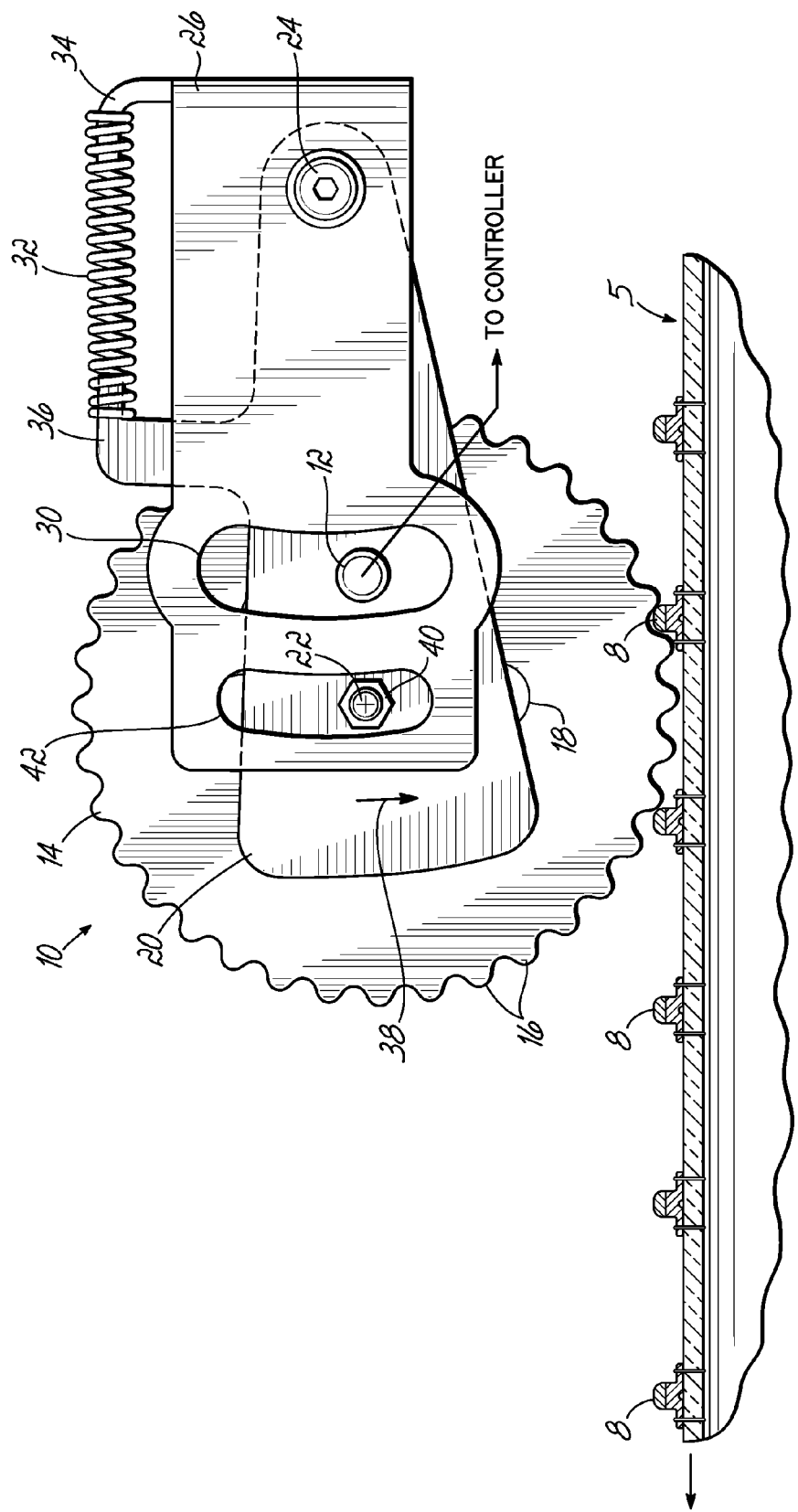
Figure 4:
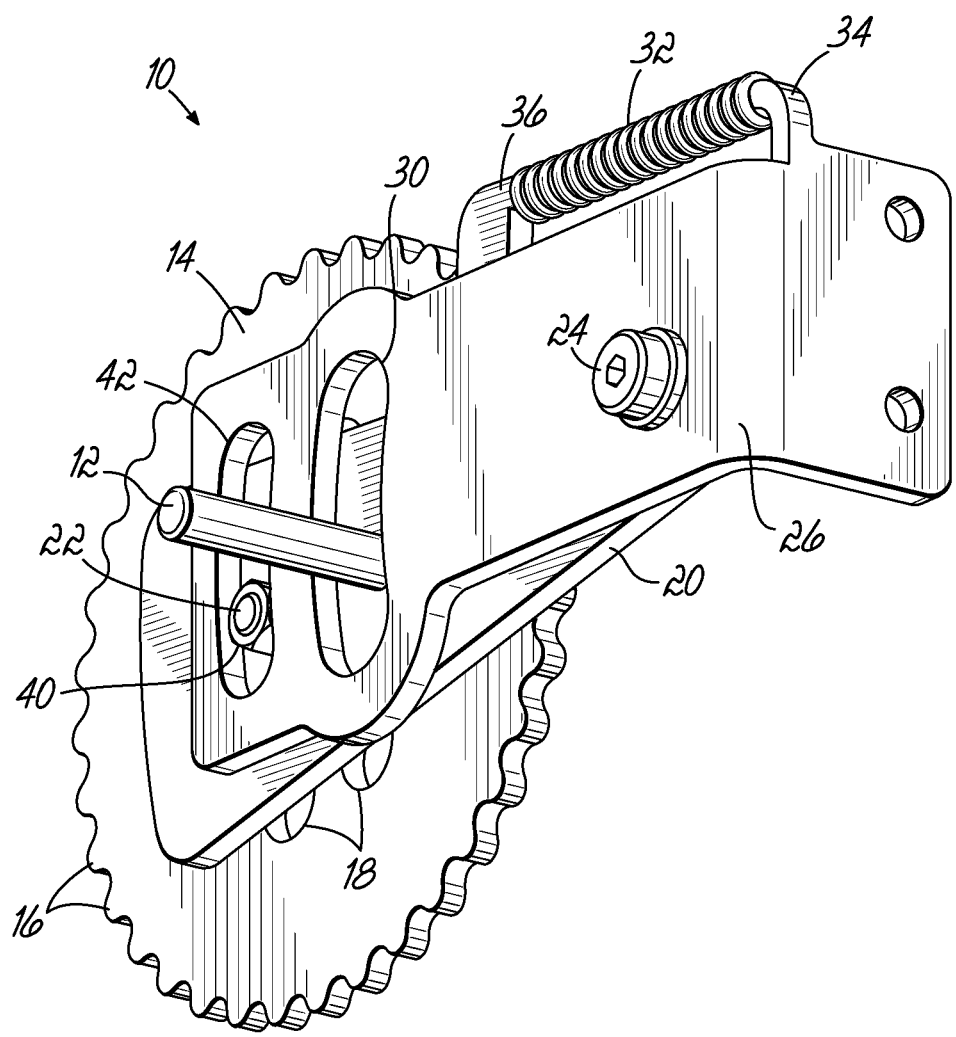
FIG. 4 is a perspective view of the device of FIGS. 3A and 3B.

With reference to FIGS. 3A, 3B, and 4, the instant embodiment of the hose detector 10 has a rotating member in the form of a wheel 14 with teeth 16 and apertures 18, mounted to a swing arm 20 by way of an axle 22. The swing arm is pivotally attached by fasteners 24 to a base 26 that is mounted to a bulkhead 28 (FIG. 2) of the hose management system 2. The base 26, swing arm 20, fasteners 24, and a spring (described later) that together position the wheel may be referred to as a spring and pivot assembly. A proximity sensor 12 is mounted to axle 22, within a cutout 30 in the base 26, at a radial distance from the axle 22 that corresponds to the distance of apertures 18 from axle 22. As a consequence, during rotation of the wheel 14 (compare FIGS. 3A and 3B), apertures 18 will repeatedly pass beneath proximity sensor 12 so that proximity sensor 12 will generate repeated alternating switch closures and switch openings in response to the presence or absence of an apertures 18 beneath proximity sensor 12.

A force device in the form of a compression spring 32 is located between a tab 34 of the base 26 and a tab 36 of the swing arm 20 so that the spring 32 applies a force causing the swing arm 20 to apply a pressure 38 (FIG. 3B) to the hose 5. A jam nut 40 on the axle 22 travels in a slot 42 positioned in the base 26 to limit the amount of travel so that the sensor 12 does not come into contact with the edges of the cutout 30.

In use, in response to automatic or manual activation as variously explained in application Ser. No. 12/025,022 incorporated by reference herein, the tractor belts 7 (FIG. 2) drive the hose 5 with scuff strips 8 into or out of the hose management device; motion of the hose causes wheel 14 to rotate when the hose 5 is driven by the tractor belts 7. Each aperture 18 passing the proximity sensor 12 creates a switch closure and switch opening at the proximity sensor, as the metal of the wheel 14 is sensed and then not sensed by the sensor 12. If the hose 5 does not move, the proximity sensor 12 has a substantially unchanging signal as it is continuously exposed to metal, or an aperture 18, or a combination of the two.

With reference to FIG. 5, logic circuitry detects a fault condition power is applied to the motors that drive the tractor belts 7 and motion of hose 5 is no detected by the wheel 14 and proximity sensor 12. This fault condition, when detected by the logic circuitry of FIG. 5, causes by the controller to disable the drive signal to the tractor belts so that the belts 7 do not damage the hose 5. Timers are used because instantaneous shutdown is not necessarily desired. For example, if the hose 5 temporarily catches on a snow or ice snag, continued pulling, even with slippage, may drag the hose free. However if allowed to go too long, the hose may be damaged.

The circuitry of FIG. 5 includes two contacts which are activated by the motor controller when the hose is being moved. A 'hose deploying' contact is closed when the drive motors are energized to deploy the hose, and a 'hose retracting' contact is closed when the drive motors are energized to retract the hose. When either the hose is deploying or retracting, 24 volt power is applied through a hose moving contact to the positive power connection of timers T1 and T2. The negative power connection of timers T1 and T2 is coupled to −24 volt power.

Proximity sensor 12 is electrically a pair of contacts, which open and close in response to the presence or absence of metal adjacent to the proximity sensor. The proximity sensor obtains power from the +24 and −24 volt supplies. The switched terminal of the proximity sensor is connected to the positive terminal of the drive winding of Relay K1, which has its negative terminal connected to the −24 volt supply. The common terminal of relay winding is coupled to the common terminal of each of timers Timer 1 and Timer 2. The switched terminals of Relay K1 are respectively coupled to the control and reset terminals of Timer 2 and the reset terminal of Timer 1. The control terminal of Timer 1 is connected to the common terminal of timer 1. Also, as noted above, the power terminals of Timer 1 and Timer 2 are energized whenever the drive motors are energized to retract or extend the hose. Thus, when the hose is being driven, Timer 2 will thus begin counting each time Relay K1 moves to the upper contact as illustrated in FIG. 5, and reset when Relay K1 moves to the lower contact as illustrated in FIG. 5. Conversely, Timer 1 will begin counting each time Relay K1 moves to the lower contact as illustrated in FIG. 5, and reset when Relay K1 moves to the upper contact as illustrated in FIG. 5. As a result, if the proximity sensor is regularly sensing the presence and absence of metal, because the wheel 14 is rotating, Timer 1 and Timer 2 will repeatedly reset and will not expire. If, however, wheel 14 is not rotating while the motors are energized, after the preset duration of time programmed into Timer 1 and Timer 2, such as a few seconds, one of Timer 1 and Timer 2 will expire and cause a closure of the internal contacts of that timer. The contacts of the timers are coupled to an external stop circuit to disable the drive motors due to a fault condition.

Although the principles of the invention have been illustrated physically and electrically with one embodiment there are a variety of other detection and control methods that would be apparent to one of ordinary skill in the art. For example, the detector could be mounted outside of the housing, rather than inside. The detector may be non-contacting, for example using direct motion detector or video observation of the scuff strips 8 or another feature on the hose 5. Or, the detection of motion may take place in the area of the axle 22 rather than the face of the wheel 14, and may include, for example, the generation of a DC output by electrical generation using magnets and stators. Further, in the illustrated embodiment, apertures 18 are used in the wheel 14, but in other embodiments, with other sensors, they may instead be a marking or indicia that provides a visual contrast for a camera. Other pairings of sensors and properties to be sensed to detect motion will be apparent to one of ordinary skill.

Further, although the present embodiment has teeth 16 between the hose outer surface and the wheel 14, traction may be obtained in other ways, and is dependent upon many variables, for example hose type, and environmental conditions.

Regarding mounting, a pivoting arm assembly is just one way to maintain pressure and contact while accounting for the variability of a hose surface that is subjected to damage as it is repeatedly dragged across a tarmac. Other configurations are envisioned. For example, the wheel 14 may be in the shape of a roller, similar to a paint roller, with a thick resilient foam that accommodates a changing surface. Or the base 26 may be mounted from a horizontal surface (not shown) rather than the vertical bulkhead 28 as illustrated, making the pivoting swing arm 20 unnecessary.

The invention has been described herein with reference to specific embodiments, and those embodiments have been explained in substantial detail. However, the principles of the present invention are not limited to such details which have been provided for exemplary purposes.

What is claimed is:

1. A hose drive and movement detector comprising:
 a drive unit comprising a belt matable to an exterior surface of an aircraft ventilation hose and rotatable by said drive unit to selectively push the belt into an aircraft ventilation hose management system or out of the aircraft ventilation hose management system, and
 a sensor that provides a signal to indicate a first condition when the hose is moving in response to the drive unit into the aircraft ventilation hose management system or out of the aircraft ventilation hose management system and that does not provide the signal when the hose is not moving.

2. The hose movement detector of claim 1 further comprising:
 a rotating member rotationally driven by the hose when the hose moves into the aircraft ventilation hose management system.

3. The hose movement detector according to claim 2 further comprising a positioner that presses the rotating member against the outside surface of the hose.

4. The hose movement detector according to claim 3 wherein the positioner is a spring and pivot assembly.

5. The hose movement detector of claim 4, the spring and pivot assembly comprising a base, an arm pivotally coupled to the base and supporting the rotating member, and a spring applying a force to pivot the arm and press the rotating member against the outside surface of the hose.

6. The hose movement detector of claim 5, wherein the sensor senses rotation of the rotating member to provide the signal.

7. The hose movement detector of claim 6 wherein the sensor is mounted to the arm.

8. The hose movement detector of claim 7 further comprising indicia on the rotating member adapted to be detected by the sensor.

9. The hose movement detector of claim 7 further comprising apertures in the rotating member that are detectable by the sensor.

10. An apparatus for providing conditioned air to an aircraft comprising:
 a substantially closed housing having an air inlet end, and an air outlet end;
 a hose hanger inside the housing;
 a longitudinally collapsible hose having a length at least twice the length of the housing, an inlet end, an outlet end, wherein said longitudinally collapsible hose is disposed within the housing so that the inlet end is proximate the air inlet end, and the outlet end is exterior to the air outlet end;
 a drive unit inside the housing proximate the air outlet end, comprising at least one belt drive assembly having a belt matable to an exterior surface of said hose and rotatable by said drive unit to selectively push the outlet end in a first direction away from the inlet end, or pull the outlet end in a second direction towards the inlet end; and
 a hose movement detector that provides a signal to indicate a first condition when the hose is moving in response to the drive unit into the housing or out of the housing, and does not provide the signal when the hose is not moving.

11. The apparatus according to claim 10, the hose movement detector comprising:
 a rotating member rotationally driven by the hose when the hose moves into the housing.

12. The apparatus according to claim 11 further comprising a positioner that presses the rotating member against the outside surface of the hose.

13. The apparatus according to claim 11, further comprising a spring and pivot assembly.

14. The apparatus of claim 13, the spring and pivot assembly comprising a base, an arm pivotally coupled to the base and supporting the rotating member, and a spring applying a force to pivot the arm and press the rotating member against the outside surface of the hose.

15. The apparatus of claim 14, further comprising a sensor to sense the rotation of the rotating member to provide the signal.

16. The apparatus of claim 15 wherein the sensor is mounted to the arm.

17. The apparatus of claim 16 further comprising indicia on the rotating member adapted to be detected by the sensor.

18. The apparatus of claim 17 further comprising apertures in the rotating member that are detectable by the sensor.

* * * * *